US007636052B2

United States Patent
Coates et al.

(10) Patent No.: US 7,636,052 B2
(45) Date of Patent: Dec. 22, 2009

(54) APPARATUS AND METHOD FOR MONITORING ACOUSTIC ENERGY IN A BOREHOLE

(75) Inventors: Don M. Coates, Santa Fe, NM (US); M. Clark Thompson, Los Alamos, NM (US); David W. Beck, Santa Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 195 days.

(21) Appl. No.: 11/962,695

(22) Filed: Dec. 21, 2007

(65) Prior Publication Data

US 2009/0159361 A1 Jun. 25, 2009

(51) Int. Cl. *G01V 3/00* (2006.01)
(52) U.S. Cl. .......... 340/854.6; 181/103; 324/333; 702/6
(58) Field of Classification Search .......... 340/854.6, 340/854.8, 855.5, 855.6; 367/82, 137; 181/102–113; 324/332–339; 702/6–14
See application file for complete search history.

(56) References Cited

U.S. PATENT DOCUMENTS

| | | | |
|---|---|---|---|
| 3,320,579 A | 5/1967 | Abbott | |
| 3,562,741 A | 2/1971 | McEvoy et al. | |
| 4,023,136 A | 5/1977 | Lamensdorf et al. | 340/18 NC |
| 4,160,970 A | 7/1979 | Nicolson | 340/18 LD |
| 4,218,507 A | 8/1980 | Deffeyes et al. | 428/328 |
| 4,308,499 A | 12/1981 | Thierbach et al. | 324/337 |
| 4,430,577 A | 2/1984 | Bouquet | 307/108 |
| 4,839,644 A | 6/1989 | Safinya et al. | 340/854 |
| 4,845,378 A | 7/1989 | Garbe et al. | 307/106 |
| 5,150,067 A | 9/1992 | McMillan | 328/64 |
| 5,355,714 A | 10/1994 | Suzuki et al. | 73/146.5 |
| 5,423,222 A | 6/1995 | Rudd et al. | 73/779 |
| 5,451,873 A | 9/1995 | Freedman et al. | 324/303 |
| 5,467,083 A | 11/1995 | McDonald et al. | 340/854.6 |
| 5,576,703 A | 11/1996 | MacLeod et al. | 340/854.4 |
| 5,587,707 A | 12/1996 | Dickie et al. | 340/870.09 |
| 5,680,029 A | 10/1997 | Smits et al. | 320/2 |
| 5,686,779 A | 11/1997 | Vig | 310/366 |
| H1744 H | 8/1998 | Clayton et al. | 374/117 |
| 5,821,129 A | 10/1998 | Grimes et al. | 436/151 |
| 5,917,160 A * | 6/1999 | Bailey | 181/112 |

(Continued)

FOREIGN PATENT DOCUMENTS

EP 0314654 5/1989

(Continued)

OTHER PUBLICATIONS

Goswami et al., On Subsurface Wireless Data Acquisition System, IEEE Transactions on Geoscience and Remote Sensing, vol. 43, No. 10, Oct. 2005.

*Primary Examiner*—Timothy Edwards, Jr.
(74) *Attorney, Agent, or Firm*—Pillsbury Winthrop Shaw Pittman LLP

(57) ABSTRACT

A system, method and device may be used to monitor acoustic energy in a borehole. Electromagnetic energy is used to energize a resonant circuit incorporating a sensor. The sensor modulates the electromagnetic energy in accordance with received acoustic energy and transmits the modulated energy so that it may be received and processed in order to obtain the desired measurements.

20 Claims, 3 Drawing Sheets

U.S. PATENT DOCUMENTS

| | | | |
|---|---|---|---|
| 5,936,913 A | 8/1999 | Gill et al. | 367/25 |
| 5,942,991 A | 8/1999 | Gaudreau et al. | 340/870.16 |
| 6,025,725 A | 2/2000 | Gershenfeld et al. | 324/652 |
| 6,234,257 B1 | 5/2001 | Ciglenec et al. | 175/50 |
| 6,393,921 B1 | 5/2002 | Grimes et al. | 73/728 |
| 6,434,372 B1 | 8/2002 | Neagley et al. | 455/106 |
| 6,489,772 B1 * | 12/2002 | Holladay et al. | 324/339 |
| 6,633,236 B2 | 10/2003 | Vinegar et al. | 340/854.4 |
| 6,670,880 B1 | 12/2003 | Hall et al. | 336/132 |
| 6,766,141 B1 | 7/2004 | Briles et al. | 455/40 |
| 6,993,432 B2 | 1/2006 | Jenkins et al. | 702/13 |
| 7,017,662 B2 | 3/2006 | Schultz et al. | 166/254.2 |
| 7,114,561 B2 | 10/2006 | Vinegar et al. | 166/250.01 |
| 7,158,049 B2 | 1/2007 | Hoefel et al. | 340/855.7 |
| 7,168,487 B2 | 1/2007 | Salamitou et al. | 166/250.11 |
| 7,180,826 B2 | 2/2007 | Kusko et al. | 367/85 |
| 7,256,707 B2 | 8/2007 | Clark et al. | 340/854.4 |
| 7,397,388 B2 | 7/2008 | Huang et al. | 340/853.3 |
| 7,548,068 B2 | 6/2009 | Rawle et al. | 324/534 |
| 2006/0266109 A1 * | 11/2006 | DiFoggio | 73/152.55 |
| 2007/0030762 A1 | 2/2007 | Huang et al. | 367/83 |
| 2007/0107528 A1 | 5/2007 | Schroeder et al. | 73/779 |
| 2007/0206440 A1 | 9/2007 | Fripp et al. | 367/81 |
| 2007/0235184 A1 | 10/2007 | Thompson et al. | 166/250.01 |
| 2008/0061789 A1 | 3/2008 | Coates et al. | 324/333 |
| 2008/0184787 A1 | 8/2008 | Coates et al. | 73/152.12 |
| 2008/0185328 A1 | 8/2008 | Stefanini | 210/222 |
| 2008/0187025 A1 | 8/2008 | Coates et al. | 374/184 |
| 2008/0253230 A1 | 10/2008 | Thompson et al. | 367/129 |
| 2008/0264624 A1 | 10/2008 | Hall et al. | 166/66.5 |
| 2009/0159361 A1 | 6/2009 | Coates et al. | 181/106 |
| 2009/0174409 A1 | 7/2009 | Coates et al. | 324/338 |

FOREIGN PATENT DOCUMENTS

| | | |
|---|---|---|
| GB | 2386691 | 9/2003 |
| GB | 2425593 | 11/2006 |

* cited by examiner

APPARATUS AND METHOD FOR MONITORING ACOUSTIC ENERGY IN A BOREHOLE

BACKGROUND

1. Field

The present invention relates generally to remote sensing and more particularly to passively communicating remote conditions by modulated reflectivity of an input electromagnetic signal.

2. Background

In resource recovery, it may be useful to monitor acoustic energy at locations remote from an observer. In particular, it may be useful to provide for monitoring conditions at or near to the bottom of a borehole that has been drilled either for exploratory or production purposes. Because such boreholes may extend several miles, it is not always practical to provide wired communications systems for such monitoring.

SUMMARY

An aspect of an embodiment of the present invention includes an apparatus for monitoring acoustic waves in a subsurface borehole, including a signal generator, constructed and arranged to produce an electromagnetic signal, a transmission line extendable along the borehole for transmitting the electromagnetic signal, a sensor including a resonant circuit and positionable in the borehole for receiving the transmitted electromagnetic signal, the resonant circuit having a resonant frequency that is variable in response to received acoustic energy, such that, in operation, the resonant circuit modulates the transmitted electromagnetic signal in accordance with the variation in the resonant frequency and returns the modulated signal along the transmission line, and a receiver, constructed and arranged to receive the modulated signal.

An aspect of an embodiment of the present invention includes a system for monitoring acoustic waves in a subsurface borehole, including generating an electromagnetic signal, transmitting the electromagnetic signal to a region of interest in the subsurface borehole, receiving acoustic energy with a sensor positioned in the region of interest, modulating, with the sensor, the electromagnetic signal in response to the received acoustic energy, and returning the modulated electromagnetic signal.

Aspects of embodiments of the invention may include a system incorporating the foregoing device and configured and arranged to provide control of the device in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
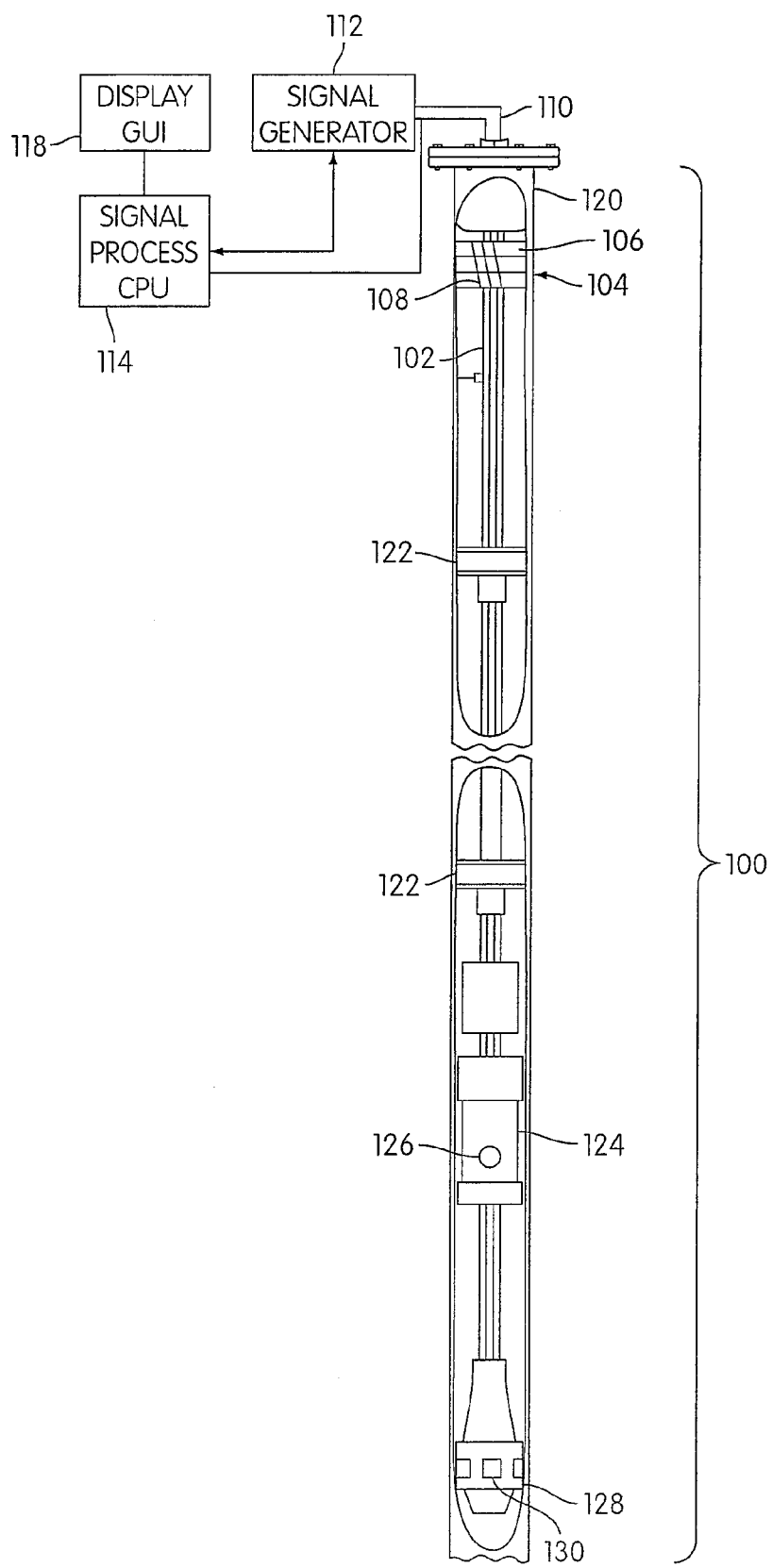
FIG. 1 shows an embodiment of an apparatus for monitoring acoustic signals in a borehole.

FIG. 1 illustrates an example of an apparatus 100 for monitoring acoustic waves in a subsurface borehole. The apparatus 100 includes an electromagnetically transmissive medium, such as a conductive line 102, for conducting electromagnetic energy through the borehole. It will be appreciated by those having ordinary skill in that art that the conductive line 102 may take different forms or embodiments, depending on the state of the borehole. Thus, for example, the conductive line 102 may comprise a production tubing string in a completed borehole or a drillstring in a borehole under construction. Near the top of the conductive line 102, a transformer 104 is provided to couple the conductive pipe to a source of electromagnetic energy. Alternate coupling methods to the transformer 104 may be employed. For example, the transmission line may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to a signal generator 112 which may be configured to produce a pulsed or a continuous wave signal, as necessary or desirable. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the modulated frequency to provide a measure of the sensed characteristic. The computer 114 may perform any desired processing of the detected signal including, but not limited to, a statistical (e.g., Fourier) analysis of the modulated vibration frequency, a deconvolution of the signal, a correlation with another signal or the like. Commercial products are readily available and known to those skilled in the art can be to perform any suitable frequency detection. Alternately, the computer may be provided with a look-up table in memory or in accessible storage, that correlates received modulated frequencies to sensed acoustic energy.

In a typical drilling application, the borehole will be lined with a borehole casing 120 which is used to provide structural support to the borehole. This casing 120 is frequently made from a conductive material such as steel, in which case it will cooperate with the line 102 in order to form a coaxial transmission line, and it is not necessary to provide any additional conductive medium. Where the casing is not conductive, a conductive sleeve may be provided within the casing in order to form the coaxial structure. In order to maintain a spacing between the line 102 and the casing 120, the apparatus 100 may include dielectric rings 122 disposed periodically along the conductive line 102.

The spacers can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line. Such coaxial cable may be particularly useful when dielectric fluid cannot be used within the casing 120 (e.g., when saline water or other conductive fluid is present in the casing 120).

A probe portion 124 is located near the distal end of the apparatus 100. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would, in principle, allow for a type of wavelength multiplexing on the coaxial line that could simplify the processing.

The probe portion includes a port 126 that is configured to communicate acoustic energy in the ambient fluid of the borehole into the probe where it may be sensed by the sensor (not shown in FIG. 1). Below the probe is illustrated a packer 128 and packer teeth 130.

In use, the signal generator 112 generates an electromagnetic pulse that is transmitted through the transmission line to the probe 124. In an alternate arrangement, the pulse may be generated locally as described in U.S. patent application Ser. No. 11/898,066, herein incorporated by reference.

The probe includes a sensor that includes a resonant circuit portion that, upon receiving the pulse, modulates and re-emits or reflects the pulse back up the transmission line. The resonant circuit may be, for example, a tank circuit that includes inductive and capacitive components. In a tank circuit arrangement, either the inductive or the capacitive component may be configured to be sensitive to acoustic energy such that as acoustic energy impinges on the component, the resonant frequency of the tank circuit changes, thereby modulating the returned electromagnetic signal in accordance with the received energy.

Figure 2:
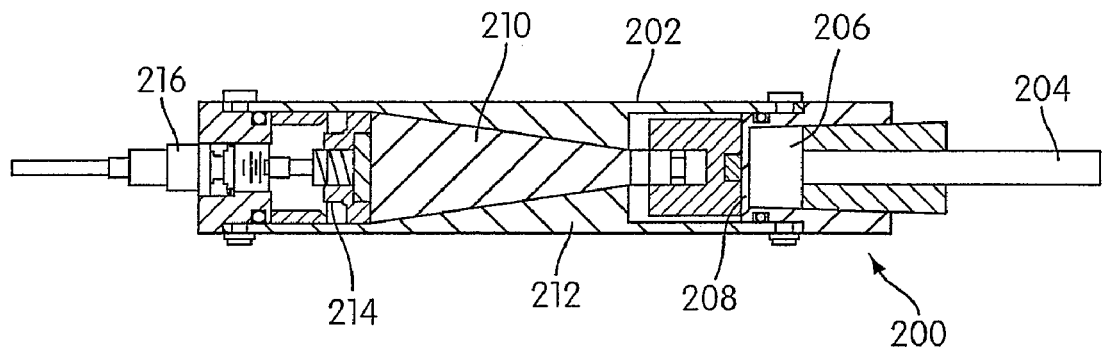
FIG. 2 shows an embodiment of a variable capacitor for use in an embodiment of the apparatus illustrated in FIG. 1.

In an embodiment, the sensor module is based on a capacitive sensing element 200 as illustrated in FIG. 2. A housing 202 has at one end a pressure feed-in tube 204 that allows acoustic energy from the borehole environment, for example via the port 126, to pass to an interior space 206 of the housing, such that it impinges on a flexible membrane 208.

Motions of the flexible membrane 208 are transmitted to a male conical portion 210 that engages a female conical portion 212 to form a variable capacitor. As shown in FIG. 2, the female conical portion 212 may simply comprise a cavity in the housing 202. Alternately, the female conical portion may be a separate structure held within the housing. One or both of the conical portions 210, 212 may include a layer of dielectric material to ensure that even when the portions are in mutual contact, they have some degree of capacitance rather than acting as a short.

The male cone 210 is spring biased towards the female cone by a spring mechanism 214, resulting in a minimum capacitance in the absence of any deflection of the membrane 208. As acoustic energy vibrates the flexible membrane 208, the male cone 210 moves relative to the female cone 212, changing a distance therebetween and altering a capacitance of the device.

A spring constant of the spring mechanism, a flexibility of the flexible membrane and a mass of the male cone cooperate to define a physical element of a frequency response of the sensor. As will be appreciated, to monitor high frequency vibrations, the inertial mass of the moveable parts should be minimized, the spring should be relatively soft and the membrane should be highly flexible. For lower frequency monitoring, these factors become less important, and sensitivity may be sacrificed in favor of more durable construction.

An electrical lead 216 is included for connecting the sensor 200 to other electrical components of the probe, not shown in this view, but illustrated in FIG. 4 and described in greater detail below.

Figure 3:
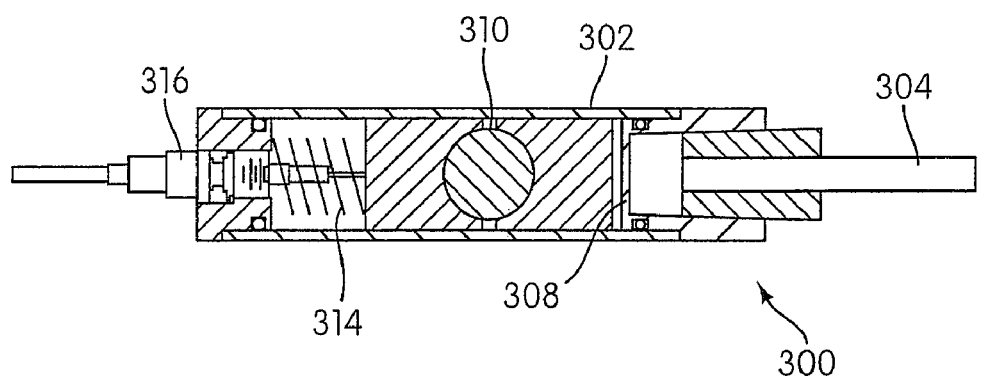
FIG. 3 shows an embodiment of a crystal oscillator for use in an embodiment of the apparatus illustrated in FIG. 1.

An embodiment makes use of a crystal-based oscillator 300 as illustrated in FIG. 3. The structure of the housing 302 may be similar to that of the housing 202. For example, the feed-in tube 304 may be similar to the feed-in tube 204 illustrated in FIG. 2. The feed-in tube 304 allows acoustic energy to pass into an interior space 206 of the sensor 300, where it is allowed to impinge on a flexible diaphragm 308.

Motion of the diaphragm 308 is transmitted to a quartz crystal 310. As pressure is transmitted to an edge of the quartz crystal, its resonant frequency changes. By correct selection of a direction of cut of the crystal, the sensor may be made to be more sensitive to pressure or to temperature. For acoustic monitoring, the crystal should be preferentially sensitive to pressure and relatively less sensitive to temperature. Furthermore, for acoustic monitoring, it is useful for the crystal to be generally relatively thin (e.g., 0.2-2.0 mm) and a typical size is on the order of 1 cm in diameter.

A return spring mechanism 314 is provided to bias the crystal 310 and its holders towards the feed-in tube 304 and thereby to tend to cause the diaphragm to return to a neutral position. As with the capacitive sensor, an electrical feed through 316 is provided to couple the sensor 300 to the sensor circuit (not shown).

In place of either a variable capacitor or a variable oscillator, a variable inductor (not illustrated) may be used as the sensor component. In such an arrangement, a voice coil or other type of variable inductor may be used to change a resonant frequency of the sensor circuit in response to the received acoustic energy.

It should be noted that for any of the embodiments, the sensor pressure feed-in tube may be configured such that it acts as an acoustic filter. In this regard, it may include an opening that acts as a high pass filter and/or an expansion chamber that acts as a low pass filter. By placing multiple such structures in series along the feed-in tube, a band pass filter may be implemented. Rather than filtering in the acoustic domain, filtering may be performed on the electronic signals, either in circuitry or at the computer as desired.

Figure 4:
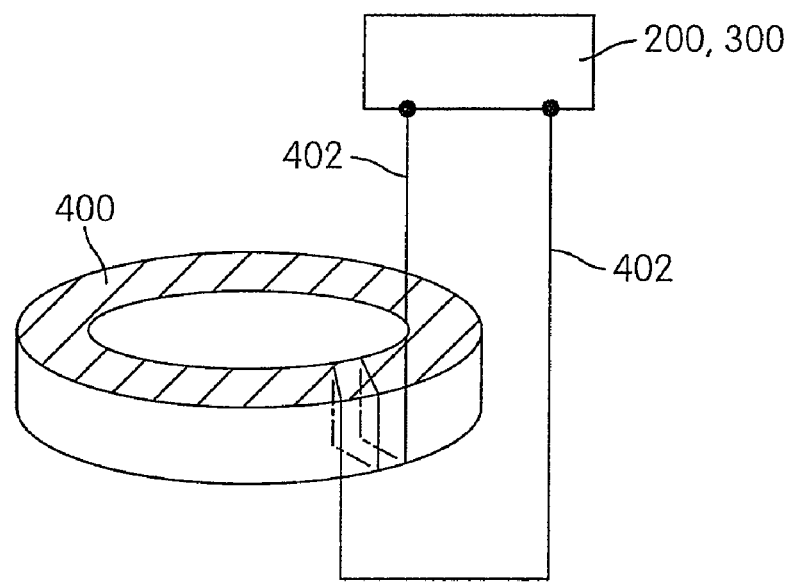
FIG. 4 schematically illustrates a circuit of which the sensors of FIGS. 2 and 3 are elements.

Whichever sensor 200 or 300 is used, it may be coupled to the transmission line via an inductive ferrite ring 400 as illustrated in FIG. 4. Electrical leads 402 are provided through the electrical feed through 216 or 316 of the sensor module. The leads 402 couple wire loops around the ferrite ring 400 and comprise an inductor. When used with a capacitive sensor 200, the inductor comprises a portion of the tank circuit along with the sensor. When used with an oscillator based sensor 300, the oscillator itself has the characteristics of an L-C circuit and the ferrite ring merely acts as a transformer to couple the oscillator to the transmission line. When used with an inductor based sensor (not illustrated), an additional capacitor should be provided in the circuit so that a complete tank is present. In this arrangement, the ferrite ring may be considered as merely a transformer (as in the oscillator configuration) or may be considered to constitute a portion of the inductance of the L-C circuit.

Figure 5:
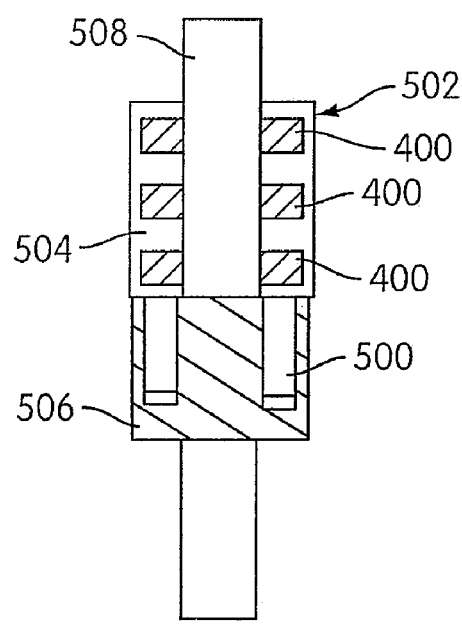
FIG. 5 is a cross-sectional illustration of a housing configured to hold a number of sensors in accordance with embodiments of the present invention.

FIG. 5 illustrates a package for sensors in accordance with embodiments of the present invention. A number of sensors 500 are disposed within a common housing 502. For each sensor 500, there is a corresponding ferrite ring 400, which is disposed in a portion 504 of the housing 502 that is made from a dielectric material, for example PTFE. As described above, the rings 400 couple the sensors to the transmission line 102. The sensors, in turn, are held in a metal block portion 506 of the sensor module. Tubing 508 is threaded into the metal block in order to positively locate the sensor package. In a typical application, this tubing may constitute either the production tubing itself, or an extension of the production string.

As will be appreciated, it is possible to combine pressure and temperature sensors in a single package, such that the temperature measurements may be used to help account for temperature related drift of the pressure sensor.

Depending on the particular use of the sensor, it may be useful to filter the signal so as to emphasize a particular frequency spectrum. For example, in acoustic emission monitoring of rock fracture or structural failures, relatively higher frequency acoustic energy may be of interest. On the other hand, for monitoring fluid movement, lower frequency information is likely to be relevant. In this regard, a number of sensors may be used in a given environment with each optimized for a particular range of frequencies. Likewise, when a number of sensors are used in a single region, information derived from them may be combined to provide directional information about the source of the acoustic energy.

Those skilled in the art will appreciate that the disclosed embodiments described herein are by way of example only, and that numerous variations will exist. For example, other arrangements of capacitors, inductors and oscillators may be employed. The invention is limited only by the claims, which encompass the embodiments described herein as well as variants apparent to those skilled in the art.

The invention claimed is:

1. A system for monitoring acoustic waves in a subsurface borehole, comprising:
    a signal generator, constructed and arranged to produce an electromagnetic signal;
    a transmission line extendable along the borehole for transmitting the electromagnetic signal;
    a sensor including a resonant circuit and positionable in the borehole for receiving the transmitted electromagnetic signal, the resonant circuit having a resonant frequency that is variable in response to received acoustic energy, such that, in operation, the resonant circuit modulates the transmitted electromagnetic signal in accordance with the variation in the resonant frequency and returns the modulated signal along the transmission line; and
    a receiver, constructed and arranged to receive the modulated signal.

2. A system as in claim 1, further comprising a processing module configured and arranged to analyze the received modulated signal to obtain information relating to characteristics of the received acoustic energy.

3. A system as in claim 2, wherein the information pertains to at least one subsurface geological condition.

4. A system as in claim 2, wherein the information pertains to subsurface fluid flow.

5. A system as in claim 2, wherein the information is obtained during drilling and pertains to drilling heads.

6. A system as in claim 1, wherein the resonant circuit comprises an inductor and the resonance frequency of the resonant circuit varies with changes in inductance of the inductor.

7. A system as in claim 1, wherein the resonant circuit comprises a capacitor and the resonance frequency of the resonant circuit varies with changes in capacitance of the capacitor.

8. A system as in claim 1, wherein the resonant circuit comprises a crystal oscillator and the resonance frequency of the resonant circuit varies with changes in a frequency characteristic of the crystal oscillator.

9. A system as in claim 8, wherein the crystal oscillator is cut along a crystal direction such that it is relatively more sensitive to changes in pressure than to changes in temperature.

10. A system as in claim 8, wherein the crystal oscillator is mechanically communicated to a flexible diaphragm such that acoustic energy impinging on the flexible diaphragm induces motions in the flexible diaphragm that are transmitted to an edge of the crystal, thereby causing the changes in the frequency characteristic of the crystal oscillator.

11. A system as in claim 1, wherein the sensor comprises a tank circuit comprising an inductor and a capacitor and the inductor is the reactive component and the capacitor is less sensitive to changes in temperature and pressure than the inductor.

12. A system as in claim 1, wherein the transmission line comprises a coaxial cable.

13. A system as in claim 12, wherein the coaxial cable comprises a conductive liner of the borehole and a conductive element arranged within and along the borehole and insulated from the conductive liner.

14. A method of monitoring acoustic waves in a subsurface borehole, comprising:
    generating an electromagnetic signal;
    transmitting the electromagnetic signal to a region of interest in the subsurface borehole;
    receiving acoustic energy with a sensor positioned in the region of interest;
    modulating, with the sensor, the electromagnetic signal in response to the received acoustic energy; and
    returning the modulated electromagnetic signal.

15. A method as in claim 14 further comprising:
    receiving the returned modulated electromagnetic signal; and
    processing the received returned modulated electromagnetic signal to obtain information relating to characteristics of the received acoustic energy.

16. A method as in claim 15, wherein the information pertains to a subsurface geological condition.

17. A method as in claim 15, wherein the information pertains to subsurface fluid flow.

18. A method as in claim 15, wherein the information is obtained during drilling and pertains to a drilling head.

19. A method as in claim 14, wherein the modulating comprises changing a resonance frequency of a resonant circuit of the sensor in response to the received acoustic energy.

20. A method as in claim 14, wherein the modulating comprises changing a resonance frequency of a crystal oscillator element of the sensor in response to the received acoustic energy.

* * * * *